Nov. 21, 1939.  H. A. BOHUSLAV  2,180,347

RECIPROCATING VALVE

Filed Oct. 15, 1938

INVENTOR.
HANS A. BOHUSLAV
BY
ATTORNEY.

Patented Nov. 21, 1939

2,180,347

UNITED STATES PATENT OFFICE 2,180,347

RECIPROCATING VALVE

Hans A. Bohuslav, San Francisco, Calif., assignor to Enterprise Foundry Corporation, San Francisco, Calif., a corporation of Nevada Application October 15, 1938, Serial No. 235,193

7 Claims. (Cl. 123—188)

This invention relates to reciprocating valves, and the object of the invention is to provide an improved reciprocating piston for a valve which will automatically open and close as the piston is reciprocated. Features of the invention are extreme simplicity and reliability. A particular feature of the invention is the incorporation of the valve in an engine, pump or compressor structure.

Further objects and advantages of the invention will appear in the following description and accompanying drawing.

Briefly described, the main feature of the invention may be said to comprise a piston reciprocably mounted in a cylinder and provided with at least one spring piston ring of narrower width than the groove around the piston in which it is seated, so that upon reciprocation of the piston, this ring due to its frictional contact with the wall of the cylinder, will be at opposite sides respectively of the ring groove as the clearance, due to the narrowness of the ring, is taken up. This relative movement of the ring in its groove is taken advantage of, to open and close a fluid port or ports on the piston to control the admission or discharge of air, gas, or liquid from one side of the piston to the other, depending on the use to which it is applied.

Figure 1:
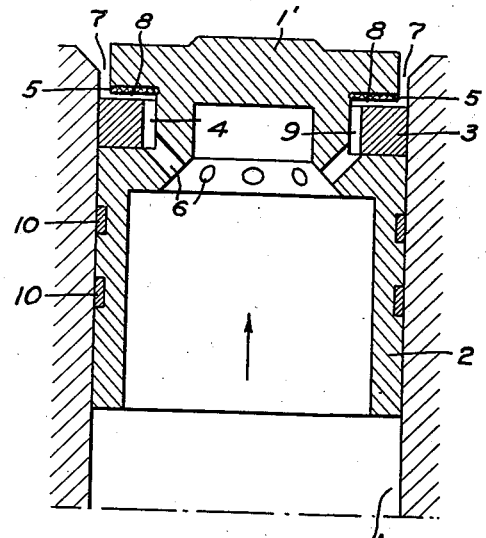
Figure 1 is a longitudinal cross section of my improved reciprocating valve shown in open position.
Figure 2:
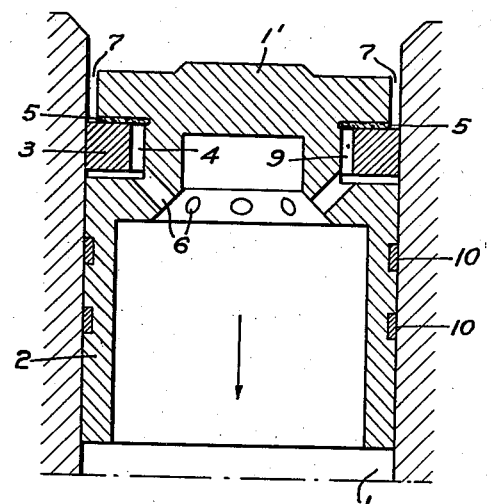
Figure 2 is a view similar to that of Figure 1 but showing the valve closed.

In the drawing, Figures 1 and 2, 1 designates a vertically disposed cylinder in which a piston 2 is reciprocably positioned. The piston is here shown as of hollow form open at the bottom only and provided with a piston ring 3 positioned in an over-size groove 4. This groove is over size both in width and depth as indicated, and since the piston ring is supposed to be a split spring ring of conventional construction tending to spring outwardly to frictionally embrace the wall of the cylinder, it follows that upon upward movement of the piston the ring will be seated upon the lower side of the groove as indicated in Figure 1 where the piston has just reached the top of its stroke, and upon downward movement of the piston the ring will contact the upper side or wall of the groove as indicated in Figure 2, where the piston is shown moved downward.

There may be a thin gasket ring of soft metal or packing at either or both sides of the groove 4 as indicated at 5, though if the ring and groove are both properly finished a sealing contact will be had without a gasket ring.

One or more holes 6 extend from the lower corner of the groove to the space within or below the piston, and the upper end of the piston above the rings 3 is of somewhat reduced diameter to provide a clearance or annular space 7 for passage of air, gas, or liquid from one side of the piston to the other by way of clearance space 8 above the ring, clearance space 9 in back of the ring, and holes 6, when the piston is on the up stroke as in Figure 1; whereas when the piston is on the down stroke as shown in Figure 2 any gas or liquid below the piston is sealed against escape and will be compressed and forced out of the cylinder through any suitable valves not shown.

In addition to the valve ring 3 the piston may in some cases be provided with one or more additional piston rings 10 if desired.

Figure 3:
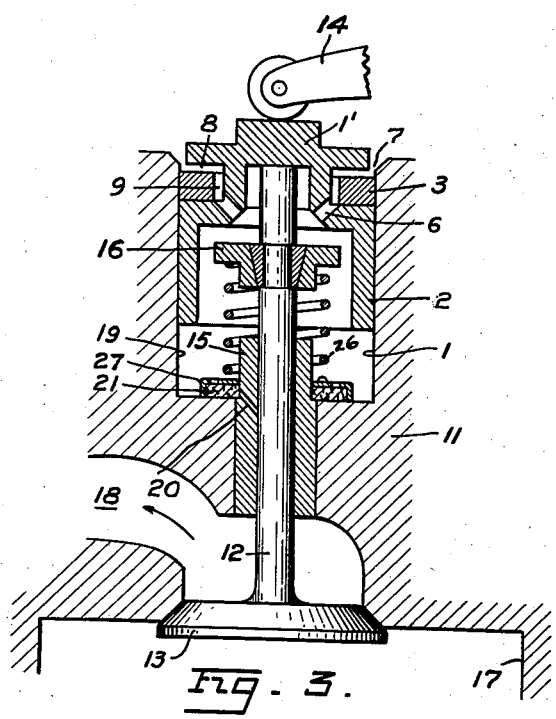
Figure 3 is a longitudinal cross section of an engine, pump or compressor exhaust valve fitted with the reciprocating valve for operation thereby.

In Figure 3 the members of Figure 1 are shown in combination with operating means for moving the piston back and forth in its cylinder, though parts thus for described being numbered as stated, and in this showing the cylinder 1 is formed in the head casting 11 of an engine concentric with the stem 12 of its exhaust valve 13 and with the upper end of the stem in abutting relation to the under surface of the head 1' of the piston and with a portion of a rocker arm 14 bearing on the head for forcing the piston downwardly to open the valve 13 against the closing force of its spring 26 surrounding the conventional valve stem guide 15 and reacting against a suitable collar 16 secured to the stem in any approved manner, as well known in the art.

In operation of the showing of Figure 3, when the rocker arm or tappet 14 forces the piston and valve stem down to open the valve 13 for exhaust of gases from engine cylinder 17 to exhaust passage 18, ring valve 3 is sealed and air is compressed by the downward movement of piston 2. This compressed air created in the space within the piston 2 and around the valve stem, is forced downwardly around the slight clearance between the stem and its guide to thus counteract and prevent the exhaust gases from entering along the valve stem from below and blow back lubricant, also from carrying carbon particles into the space and consequent injury to the parts.

Also to be noted is that each time the pressure is set up upon downward movement of the piston, a small quantity of oil is forced from the sump 19 surrounding the valve stem guide 15 into oil hole 20 to lubricate the stem. Suitable fibrous material 21 may be used in the bottom of the sump to prevent too much oil being forced out. A perforated metal cup 27 inverted over the fiber keeps it from unduly compacting. The oil is easily replenished from the top of the piston as it will flow in when ring valve 3 is open, or may be supplied through any other feed channel provided.

Figure 4:
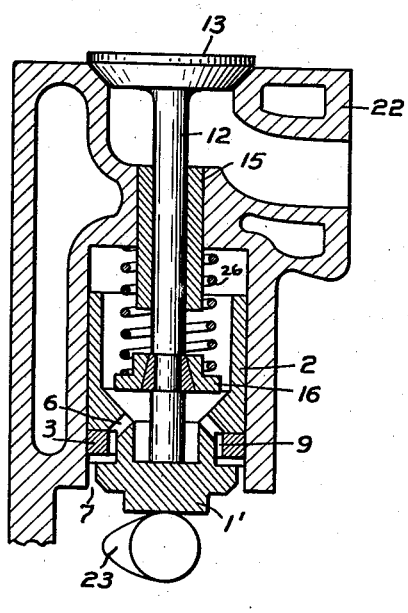
Figure 4 is a view similar to that of Figure 3, but showing the application of the invention to an L head engine valve.

In the showing of Figure 4 the adaptability of the invention to the exhaust valve of an L-head engine 22 is shown. In this case the members are all inverted, but since they are all identical with those shown in Figure 3 and operate the same way they are correspondingly numbered, and need no further description.

Instead of a rocker arm or tappet being shown to operate the piston 2 and the exhaust valve, a cam 23 is indicated. However, as the means for operating the mechanism will depend on whether it is used on an engine, pump, or compressor, as well as the particular designs, and hence no limitation is to be implied from the operating construction described.

Figure 5:
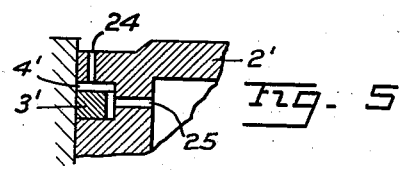
Figure 5 is a reduced size vertical section showing a modification in the arrangement of the piston parts.

Also to be noted is that although I show the head 1' of the piston reduced in diameter to provide clearance for fluid from or to the back of the ring 3 and passages 6, this may be varied in several ways, one of which is shown in Figure 5 which shows a portion of a piston 2' with a valve ring 3' in an over-size free groove 4' as described, but the piston head is not reduced in diameter, as holes 24 above the ring cooperate with holes 25 at the bottom of the groove to afford the passageway required. Other modifications are within the scope of the invention.

It is of course to be understood that while I show the invention with the piston operating vertically, it may be used as well horizontally or in any other position.

It is also apparent that instead of using the resilience of the split piston ring itself to frictionally engage the cylinder wall, the effect may be augmented if required by interposing spring strips behind the ring, as well known in engine practice.

I claim:

1. A piston reciprocably mounted in a cylinder, a piston ring on said piston positioned in a groove substantially wider than the width of said ring so as to provide for relative reciprocative movement of said ring longitudinally of said piston as the piston is reciprocated, and a fluid passage including the space between said ring and the wall of its groove extending from one side of said piston to the opposite side adapted to be closed upon one way reciprocative movement of said piston by relative displacement of said ring in its groove, and opened upon reverse movement.

2. In the construction set out in claim 1, said piston being of reduced diameter on one side of said ring to provide an annular extension of said passage between said piston and the wall of said cylinder.

3. A piston reciprocably mounted in a cylinder, a piston ring on said piston positioned in a groove substantially wider than the width of said ring so as to provide for relative reciprocative movement of said ring longitudinally of said piston as the piston is reciprocated, said groove also being substantially deeper than the depth of said piston ring, a passageway extending from the space back of the ring to one side of the piston, and means forming a passageway extending from the opposite side of the piston to the side of the groove remote from said one side of the piston.

4. A piston reciprocably mounted in a cylinder, a piston ring on said piston positioned in a groove substantially wider than the width of said ring so as to provide for relative reciprocative movement of said ring longitudinally of said piston as the piston is reciprocated, a passageway for fluid extending from one side of the piston to the opposite side, said passageway alternately opened and sealed respectively by reciprocative movement of said ring as the piston is reciprocated.

5. In a construction as set out in claim 4, a spring closed poppet valve concentrically mounted with relation to said piston and with the stem of the valve arranged to be moved by said piston when the latter is moved, means for moving said piston to move said stem and open said poppet valve, the cylinder of said piston forming a chamber around the stem of said valve, and said piston upon movement to open the valve arranged to compress air into said chamber about said stem and to release said pressure upon reverse movement.

6. In a construction as set out in claim 4, a spring closed poppet valve concentrically mounted with relation to said piston and with the stem of the valve arranged to be moved by said piston when the latter is moved, means for moving said piston to move said stem and open said poppet valve, said cylinder for said piston forming a chamber around the stem of said valve, and said piston upon movement to open the valve arranged to compress air into said chamber about said stem and to release said pressure upon reverse movement, and means operated by the compression of air in said chamber for forcing a lubricant to the stem of said poppet valve.

7. In a construction as set out in claim 4, a spring closed poppet valve concentrically mounted with relation to said piston and with the stem of the valve arranged to be moved by said piston when the latter is moved, means for moving said piston to move said stem and open said poppet valve, said cylinder for said piston forming a chamber around the stem of said valve, and said piston upon movement to open the valve arranged to compress air into said chamber about said stem and to release said pressure upon reverse movement, and means operated by the compression of air in said chamber for forcing a lubricant to the stem of said poppet valve comprising a channel leading from said chamber to the side of the valve stem, and an oil absorbent material covering said channel from which oil is forced by pressure of said air when compressed.

HANS A. BOHUSLAV.